US006250212B1

United States Patent
Yeung et al.

(10) Patent No.: US 6,250,212 B1
(45) Date of Patent: Jun. 26, 2001

(54) TOASTER HAVING CARRIAGE-LIFT MECHANISM

(75) Inventors: Pat Hok-Kwong Yeung, Fotan (HK); Francis E. Marino, Upton, MA (US)

(73) Assignee: The Rival Company, Kansas City, MO (US)

(*) Notice: Subject to any disclaimer, the term of this patent is extended or adjusted under 35 U.S.C. 154(b) by 0 days.

(21) Appl. No.: 09/377,800

(22) Filed: Aug. 20, 1999

(51) Int. Cl.$^7$ ........................................... A47J 37/08
(52) U.S. Cl. ..................... 99/391; 99/329 RT; 99/393; 426/520; 426/523
(58) Field of Search ................... 99/329 P, 329 RT, 99/391, 385, 393; 426/520, 523

(56) References Cited

U.S. PATENT DOCUMENTS

| D. 310,004 | 8/1990 | Storsberg | D7/329 |
|---|---|---|---|
| D. 338,131 | 8/1993 | Stützer | D7/330 |
| 1,850,750 | 3/1932 | Freeman . | |
| 1,876,901 | 9/1932 | Forbes . | |
| 2,070,333 | * 2/1937 | Freeman | 99/391 |
| 2,497,205 | * 2/1950 | Brewton | 99/391 |
| 2,553,593 | 5/1951 | Lermont | 161/1 |
| 2,750,876 | 6/1956 | Visos | 99/391 |
| 2,771,022 | * 11/1956 | Hollister | 99/391 X |
| 3,140,650 | 7/1964 | Woron | 99/329 |
| 3,575,102 | 4/1971 | Parr | 99/391 |
| 3,636,858 | 1/1972 | Paaskesen | 99/335 |
| 3,869,970 | 3/1975 | Eagle | 99/329 |
| 4,188,865 | 2/1980 | Bjarsch | 99/327 |
| 4,201,124 | 5/1980 | Huggler | 99/327 |
| 4,285,272 | 8/1981 | Klijnstra | 99/391 |
| 4,320,698 | 3/1982 | Mugge | 99/334 |
| 4,345,513 | 8/1982 | Holt | 99/327 |
| 4,345,515 | 8/1982 | Holt | 99/393 |
| 4,397,227 | 8/1983 | Landry | 99/334 |
| 4,402,258 | 9/1983 | Guarnerio | 99/393 |
| 4,404,899 | 9/1983 | Weiss | 99/332 |
| 4,491,066 | 1/1985 | Juriga et al. | 99/391 |
| 4,878,423 | 11/1989 | Birkert et al. | 99/332 |
| 4,972,768 | 11/1990 | Basora San Juan | 99/391 |
| 4,976,195 | 12/1990 | Cavazos | 99/391 |
| 4,986,173 | 1/1991 | Hahnewald et al. | 99/338 |
| 5,018,437 | 5/1991 | San Juan | 99/327 |
| 5,054,382 | 10/1991 | Ward et al. | 99/327 |
| 5,072,662 | 12/1991 | Yip | 99/327 |

(List continued on next page.)

FOREIGN PATENT DOCUMENTS

| 048 769 | 9/1980 | (EP) . |
| 084 065 | 1/1982 | (EP) . |
| 333652 | 8/1930 | (GB) . |

Primary Examiner—Reginald L. Alexander
(74) Attorney, Agent, or Firm—Brinks Hofer Gilson & Lione

(57) ABSTRACT

A toaster for facilitating removal of food items by allowing the bread carriage to be raised from a loading position to a raised position. A toaster is provided having a housing frame having an upper portion defining at least one opening for receiving an item to be toasted. A carriage for supporting the item is mounted to the frame and movable relative to the frame to at least three positions: a toasting position, a loading position and a raised position which is located vertically higher than the loading position. A flange is fixed to the carriage, and an abutment member is provided for engagement with the flange. The member includes a slot defining at least a first flange-receiving area adjacent one end of the slot and a second flange-receiving area adjacent another end of the slot. When the carriage is moved to the loading position, the flange is positioned and may be locked within the first flange-receiving area. When the carriage is positioned in the raised position, the flange is positioned within the second flange-receiving area. This may allow the carriage to be locked in the raised position.

36 Claims, 3 Drawing Sheets

U.S. PATENT DOCUMENTS

| | | | |
|---|---|---|---|
| 5,085,136 | 2/1992 | Eisenberg | 99/391 |
| 5,095,814 | 3/1992 | Ott et al. | 99/391 |
| 5,121,678 | 6/1992 | Del Fresno | 99/391 |
| 5,156,637 | 10/1992 | Wai-Ching | 99/388 |
| 5,181,455 | 1/1993 | Masel et al. | 99/391 |
| 5,193,439 | 3/1993 | Finesman et al. | 99/327 |
| 5,216,944 | 6/1993 | Trujillo | 99/339 |
| 5,304,782 | 4/1994 | McNair et al. | 219/518 |
| 5,317,960 | 6/1994 | Cumfer | 99/391 |
| 5,385,082 | 1/1995 | Huggler et al. | 99/328 |
| 5,400,697 | 3/1995 | Dax et al. | 99/389 |
| 5,423,246 | 6/1995 | McNair et al. | 99/334 |
| 5,458,052 | 10/1995 | McNair et al. | 99/385 |
| 5,487,328 | 1/1996 | Fujii | 99/390 |
| 5,528,980 | 6/1996 | McClean | 99/389 |
| 5,598,765 | 2/1997 | Yip | 99/327 |
| 5,642,657 | 7/1997 | Yeung et al. | 99/334 |
| 5,647,270 | 7/1997 | Rousseau et al. | 99/327 |
| 5,653,158 | 8/1997 | Balandier et al. | 99/327 |
| 5,664,481 | 9/1997 | Huggler | 99/328 |
| 5,664,483 | 9/1997 | Yip | 99/391 |
| 5,664,974 | 9/1997 | Endo et al. | 439/884 |
| 5,692,432 | 12/1997 | Hazan et al. | 99/328 |
| 5,746,115 | 5/1998 | Yip | 99/339 |
| 5,758,567 | 6/1998 | Van Der Wal et al. | 99/331 |
| 5,771,780 | 6/1998 | Basora et al. | 99/327 |
| 5,901,638 | 5/1999 | Houel | 99/327 |
| 5,901,639 | 5/1999 | Huggler | 99/328 |
| 5,918,532 | 7/1999 | Arnedo et al. | 99/327 |
| 5,947,006 * | 9/1999 | Mauffrey | 99/391 X |

* cited by examiner

TOASTER HAVING CARRIAGE-LIFT MECHANISM

FIELD OF THE INVENTION

The present invention relates to a kitchen appliance for toasting bread and other food items. In particular, the invention relates to a slotted, upright bread toaster having a bread carriage liftable from a loading position to a raised position to facilitate the removal of items to be toasted from the toasting slots.

BACKGROUND OF THE INVENTION

Conventional electric bread toasters are devices configured to simplify the toasting of bread slices or other generally flat food items. These toasters generally comprise an upright housing having rectangularly shaped toast-receiving slots defined in the top surface of the housing. Bread slices are inserted through these slots and rest on a spring-biased bread carriage inside a toasting chamber. In this loading position, the bread slices are held partially within the toasting chamber and are allowed to project partially from the slots to facilitate the loading and removal of the bread slices. The toasting chamber is surrounded by electric heating elements. A manual toasting lever connected to the carriage allows the user to push the carriage toward the bottom of the unit, thereby lowering the bread completely into the toasting chamber. Typically, a solenoid device holds the carriage and lever in this toasting position and a microswitch circuits power to the heating elements. When the toasting cycle is completed, the solenoid releases the carriage and the spring returns the carriage to the loading position.

These conventional toasters do have shortcomings, however. Most significantly, when the toasting of comparatively small bread slices or other smaller food items is desired, such items may be too short to project from the toasting slots when the carriage is in the loading position. Thus, a user may be forced to insert his or her fingers, or an object such as a fork, into the toasting chamber to retrieve the toasted bread slices. This may lead to burns from the hot heating elements or even electric shock from contact with other hazardous electrical components within the chamber.

These shortcomings have been addressed in various patents in the industry. For example, U.S. Pat. No. 5,072,662 to Yip discloses an electric toaster having a pair of interengaging brackets to allow a bread carriage to be positioned in a first toast-removal position and a second toast-removal position higher than the first position. U.S. Pat. No. 5,095,814 to Ott et al. discloses a toaster having a toasting rack and a separate lift device to elevate the rack relative to the carriage. The mechanisms disclosed in these patents require two-handed operation, however, in that the user must hold the bread carriage in the second toast-removal position while removing the toast from the toaster. Furthermore, the mechanisms disclosed in both of these patents utilize many parts arranged in a complex fashion. These mechanisms therefore add significantly to the manufacturing cost of the units.

Therefore, there is a need for a toaster that allows smaller bread slices to be removed more easily by the user without the implementation of complex and costly bread-removal mechanisms.

SUMMARY OF THE INVENTION

Accordingly, the present invention is directed to a toaster that substantially obviates one or more of the above problems due to limitations and disadvantages of the related art.

To achieve these and other advantages, and in accordance with the purposes of the present invention, as embodied and broadly described, a toaster is provided having a housing frame having an upper portion defining at least one opening for receiving an item to be toasted. A carriage for supporting the item is mounted to the frame and movable relative to the frame to at least three positions: a toasting position, a loading position and a raised position which is located vertically higher than the loading position. Means for releasably holding said carriage in the raised position are provided to facilitate removal and loading of items to be toasted.

In another aspect of the invention, a heater is also provided for toasting the item when the carriage is in the toasting position. A flange is fixed to either the carriage or the frame, and an abutment member is provided for engagement with the flange. The member includes a slot defining at least a portion of a first flange-receiving area adjacent one end of the slot and a second flange-receiving area adjacent another end of the slot. When the carriage is positioned in the loading position, the flange is positioned outside the second flange-receiving area or within the first flange-receiving area. When the carriage is positioned in the raised position, the flange is positioned within the second flange-receiving area.

In another aspect of the invention, the flange-receiving areas of the abutment member are separated by an abutment formation that hinders movement of the flange throughout the full length of the slot. When moving the carriage from the loading position to the raised position, the flange is forcibly slidable within the slot from the first flange-receiving area past the abutment formation to the second flange-receiving area to correspondingly move the carriage.

In yet another aspect of the invention, the abutment member is mounted to the frame. The member includes an elongated slot having an open end for receiving the flange and defines an abutment formation that hinders upward movement of the flange throughout the full length of the slot. The flange and slot cooperate to hinder movement of the carriage between the loading position and the raised position.

In yet another aspect of the invention, a method for toasting a food item is provided. The method includes the steps of providing an electric toaster having a housing frame, the frame having an upper portion defining at least one opening for receiving an item to be toasted. The toaster also includes a carriage for supporting the item which is movable relative to the frame to at least a toasting position, a loading position and a raised position. The carriage is biased toward the loading position when in the toasting position, and a flange is preferably fixed to the carriage for movement therewith. The frame preferably includes an abutment member defining a slot for slidable engagement with the flange. The sides of the slot define an abutment formation. A food item to be toasted is next placed within the slot and on the carriage when the carriage is in the loading position. The carriage is manually lowered to the toasting position wherein the food item is toasted. After the item is toasted, the carriage is automatically released into the loading position wherein the flange engages the abutment member and movement of the flange is upwardly hindered by the abutment formation. The carriage is then manually raised from the loading position to the raised position by moving the flange around the abutment formation, and the item to be toasted is removed from the bread carriage. The carriage may be left in the raised position or manually lowered by the user.

The invention, together with further objects and attendant advantages, will best be understood by reference to the following detailed description of the preferred embodiments, taken in conjunction with the accompanying drawings.

DETAILED DESCRIPTION OF THE INVENTION

Figure 1:
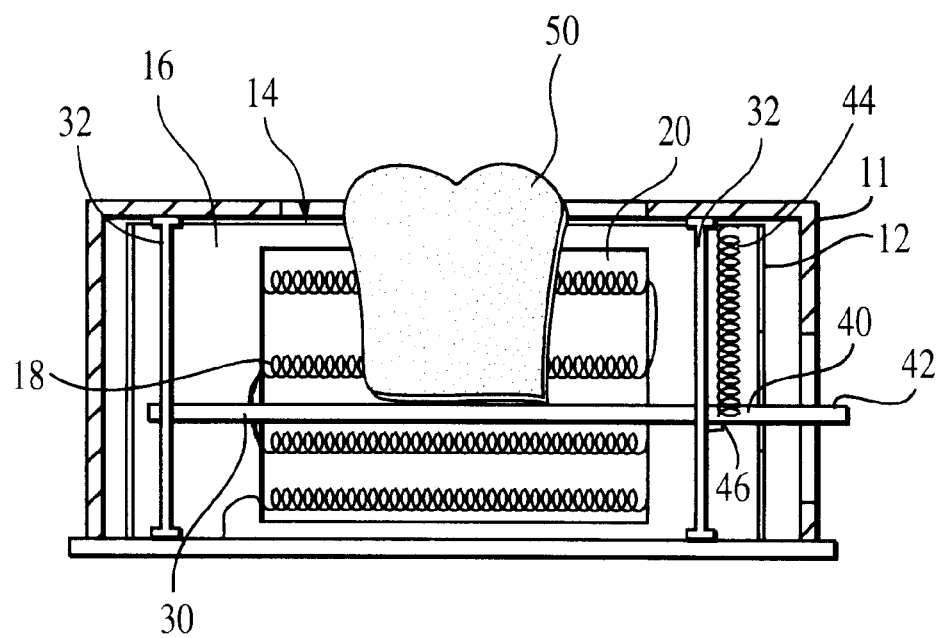
FIG. 1 is a cut-away view of a toaster implementing the preferred embodiment of the present invention.

FIG. 1 shows a toaster of the present invention. As shown in the Figure, toaster 10 includes an outer housing 11 and a housing frame 12 defining a pair of bread-receiving slots 14. The slots 14 open into the toasting chamber 16 within the housing frame 12. Wire heating elements 18 are provided on the interior walls 20 of the housing frame 12 to provide heat to the chamber 16.

Figure 2:
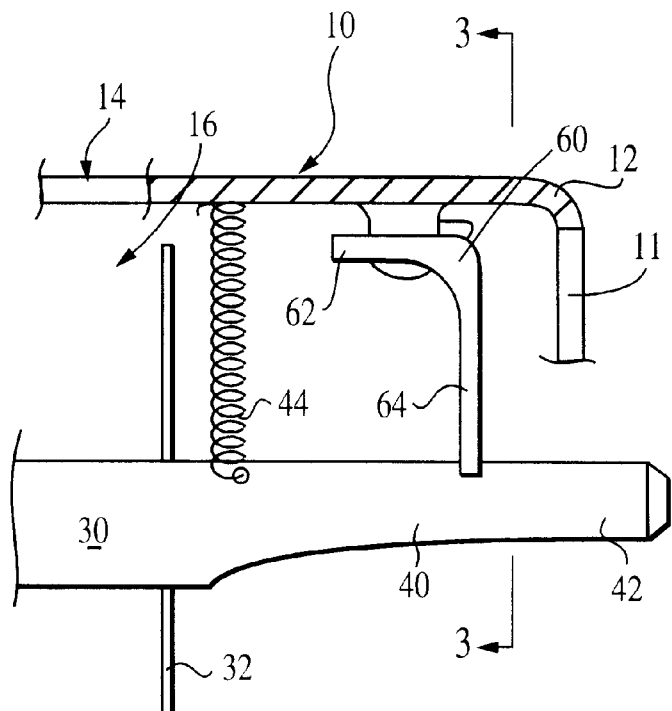
FIG. 2 is a cut-away view showing the preferred embodiment of the present invention.
Figure 3:
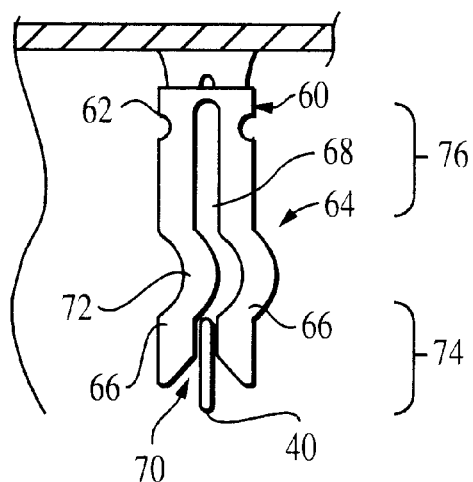
FIG. 3 is a side view taken along line 3—3 showing the mechanism of FIG. 2 when the carriage is in the loading position.
Figure 4:
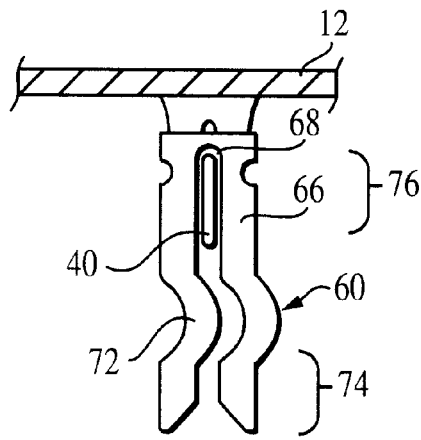
FIG. 4 is the side view of FIG. 3 with the carriage in the raised position.

A bread carriage 30 is mounted on vertical rails 32 within the frame 12 to allow the carriage 30 to slide vertically within the chamber 16 relative to the frame 12. A flange 40 projects from the right side of the carriage 30 and projects from the housing frame 12 and the housing 11 and preferably is secured to a toasting lever 42. The inner portion 46 of the flange 40 preferably is attached to one end of an expansion coil spring 44. The other end of the spring 44 is attached to the frame 12. This allows the spring to bias the carriage 30 and flange 40 toward the upper portion of the housing frame 12. In the "off" state of the toaster, the carriage is positioned as shown in FIGS. 1–3 with the carriage positioned in a loading position. In this position, slices of bread 50 or other items to be toasted may be conveniently loaded through the slots 14 to rest on the carriage 30. With larger or more conventionally sized pieces of bread, the bread will project above the level of the top of the toaster 10 as shown in FIG. 1.

In the loading position, the flange 40 is biased by the spring 44 against a portion of an abutment member 60 as shown in FIGS. 2 and 3. As best seen in FIG. 3, the abutment member 60 includes a horizontal mounting portion 62 and a vertical portion 64. The horizontal mounting portion 62 allows the member 60 to be mounted to the underside of a top surface of the housing frame 12. Side portions 66 extend vertically downwardly from the mounting portion 62 to define a generally elongated slot 68. The slot 68 includes an opening 70 at the bottom of the vertical portion 64, and is sized to closely receive a cross-section of the flange 40.

A curved, cam-like abutment formation 72 is formed preferably in the mid-portions of the side portions 66. The formation 72 hinders the movement of the flange 40 upwardly within the slot 68. The straight portion of the slot 68 below the formation 72 defines a first flange-receiving area 74, and the area above the formation 72 forms a second flange-receiving area 76. The abutment member 60 is preferably molded from plastic to allow the member to be slightly deformable.

The first flange-receiving area of the abutment member essentially forms a "false" upper limit for movement of the carriage 30 to the loading position. When the user must lift out smaller pieces of bread from the toaster slots, the user simply applies a slight force to the toasting lever 42 to move the flange 40 past the abutment formation 72 to the second flange-receiving area 76. As the flange 40 moves past the abutment formation 72, the side portions 66 of the abutment member 60 deform slightly and move apart from each other to allow the flange 40 to move to the second receiving area 76. This lifts the carriage 30 to the raised position and raises the bread higher relative to the frame 12. Upon movement of the flange 40 into the second flange-receiving area 76, the abutment formation 72 of the member 60 supports the underside of the flange 40. Thus, the carriage 30 will remain in this raised position when the user releases the lever 42. This feature of the preferred embodiment allows the user to raise the carriage 30 and remove the toasted item from the unit conveniently with only one hand.

To release the carriage 30 from the raised position, the user need only depress the lever 42 slightly downwardly to urge the flange 40 out of the second receiving area 76. In the alternative, the weight of the carriage 30 may be increased or the size of the abutment formation 72 may be decreased to lessen the retaining ability of the abutment member 60. In such an alternate embodiment, when the user releases the lever 40, the weight of the carriage 30 allows the carriage to move back to the loading position where it is held in place by the spring 44.

It is important to note that the abutment member 60 need not be mounted to the frame 12 and the flange 40 mounted to the carriage 30. In an alternative embodiment, a reversed configuration may be implemented, wherein, for example, the abutment member 60 is mounted to the carriage 30 and the flange 40 is mounted to the frame 12. The toaster would still function as previously described for allowing the carriage 30 to be positioned in a loading position or a raised position as the flange 40 interacts with the abutment member 60.

Figure 5:
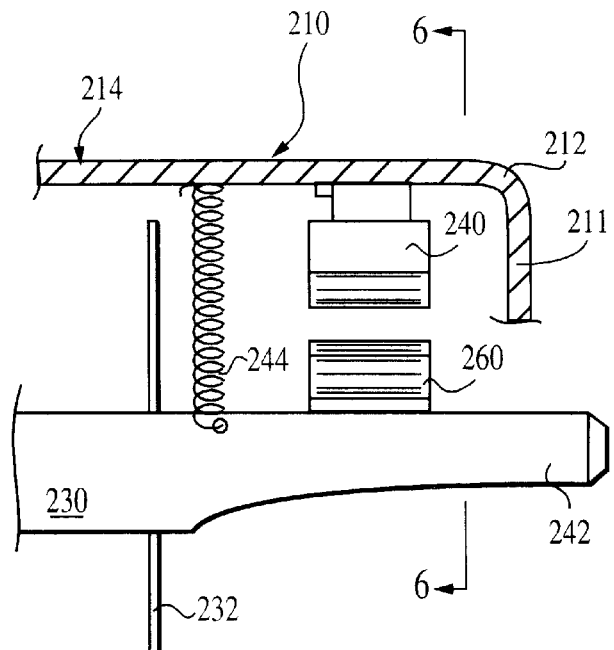
FIG. 5 is a side view of a second embodiment of the present invention.

Another alternate embodiment is shown in FIGS. 5–8. In these Figures, similar components from the first embodiment are labeled with reference numbers having numeral "2" in the hundreds place. Turning to FIG. 5, a toaster interior is shown having a toaster frame 212 and toasting lever 242 linked to a movable toasting carriage 230 as in the first embodiment. An alternate abutment member and flange configuration is shown, in that the flange 240 is mounted to the frame 212 and the abutment member 260 is mounted to the toasting lever 242. In the alternative, the abutment member 260 may be mounted to the carriage 230, and the positioning of these components may be reversed.

Figure 6:
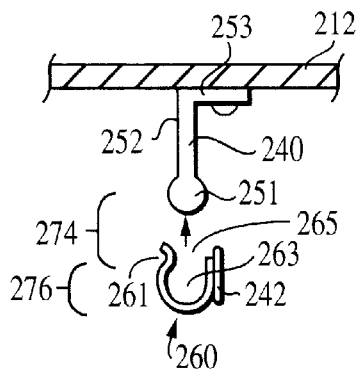
FIG. 6 is the side view of FIG. 5 taken along line 6—6 showing the mechanism of FIG. 5 when the carriage is in the loading position.

As shown in the cross-section of FIG. 6 taken along line 6—6 of FIG. 5, the flange 240 includes a finger projection portion 252 preferably extending along the direction of movement of the carriage 230. In this embodiment, the finger portion 252 extends downwardly from the frame 212. The finger portion 252 includes a flared end portion 251, preferably defining a partially cylindrical shape as shown, although other shapes may be used and are contemplated.

The abutment member 260 is preferably mounted to a side of the toasting lever 242, although other positions may be used.

The abutment member 260 preferably comprises flat bent metal or plastic which is preferably formed into a deformable "C" shaped clamp defining a pocket 263 for receiving at least a portion of the flange 240. The pocket 263 therefore forms a second flange-receiving area 276. The opening 265 of the shape includes a flared end portion 261. The clamp itself is adapted to capture the flared end portion 251 of the flange 240 within the pocket 263, and the flared end portion 261 of the member 260 reduces the opening 265 to prevent the flared end portion 251 from entering the pocket 263 without some force supplied by the user. This area on and slightly above the portion 251 of the abutment member 260 forms a first flange-receiving area 274. In FIG. 6, the carriage 230 balances along with the bias of spring 244 to rest in the loading position as shown.

Figure 7:
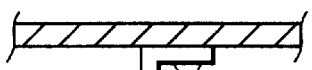
FIG. 7 is the side view of FIG. 6 with the carriage in the raised position.
Figure 8:
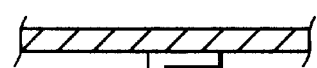
FIG. 8 is the side view of FIGS. 6 and 7 with the carriage in the raised position and locked.

FIG. 7 shows the toasting lever 242 positioned with the flared end portion 261 resting at the flared opening 265 of the abutment member 260. At the end of the toasting cycle, the toaster carriage 230 may be manually lifted to this raised position. If the carriage is lifted by lifting the lever 242 relative to the frame 212, the abutment member 260 will deform slightly, thereby widening the opening 265 to allow the flared end portion 251 of the flange 240 to enter the pocket 263. This will fully capture the flared end portion 251 within the abutment member 260 and hold the carriage 230 in a "locked" (and further raised) position as shown in FIG. 8. To release the carriage 230 from this position, the user will depress the toasting lever 242 downwardly to urge the flared end portion 251 out of the pocket 263.

Of course, it should be understood that a wide range of changes and modifications can be made to the embodiments described above. It is therefore intended that the foregoing detailed description be regarded as illustrative rather than limiting and that it be understood that it is the following claims, including all equivalents, which are intended to define the scope of this invention.

What is claimed is:

1. An electric toaster comprising:
   a housing frame, said frame having an upper portion defining at least one opening for receiving an item to be toasted;
   a carriage for supporting said item to be toasted, said carriage slidably mounted to said frame and movable relative to said frame to at least a toasting position, a loading position and a raised position;
   a heater for toasting said item when said carriage is in said toasting position;
   a flange fixed to one of said carriage and frame; and
   an abutment member fixed to the other of said carriage and frame, said member including a slot defining at least a portion of a first flange-receiving area adjacent one end of said slot and a second flange-receiving area adjacent another end of said slot for engagement with said flange;
   wherein said carriage is positioned in said loading position when said flange is positioned within said first flange-receiving area and said carriage is positioned in said raised position when said flange is positioned within said second flange-receiving area.

2. The invention of claim 1 wherein said flange is fixed to said carriage for movement therewith, and said abutment member is in contact with said frame.

3. The invention of claim 1 wherein said flange is fixed to said frame and said abutment member is fixed to said carriage for movement therewith.

4. The invention of claim 3 wherein said flange further comprises a finger projection having a flared end portion.

5. The invention of claim 4 wherein said abutment member further comprises a deformable clamping member adapted to clamp said flared end portion of said finger projection, said clamping member including a flange-receiving area and a flared opening.

6. The invention of claim 1 wherein movement of said flange within said slot is hindered by a first abutment formation formed on said abutment member.

7. The invention of claim 6 wherein said flange-receiving areas are separated by said first abutment formation, and said flange is forcibly slidable within said slot from said first flange-receiving area around said abutment formation to said second flange-receiving area to correspondingly move said carriage from said loading position to said raised position.

8. The invention of claim 6 wherein said carriage is biased toward said loading position when in the toasting position.

9. The invention of claim 7 wherein said flange is biased by a biasing force toward said first abutment formation when said carriage is in the loading position and said flange is positioned in the first flange-receiving area.

10. The invention of claim 9 wherein said first abutment formation further comprises a curved camming surface defined by a portion of said slot to hinder movement of said flange through said slot.

11. The invention of claim 10 wherein said biasing force is not sufficient to move said flange around said first abutment formation.

12. The invention of claim 9 wherein said first abutment portion cooperates with said biased carriage to maintain said carriage in said loading position.

13. The invention of claim 9 wherein one of said flange and abutment formation is deformable with force to allow at least a portion of said flange to be slidable past said camming surface from said first flange-receiving area to said second flange-receiving area.

14. The invention of claim 13 wherein said abutment member is deformable with force to widen said slot to allow at least a portion of said flange to be slidable past said abutment formation.

15. The invention of claim 14 further comprising a lifting handle mounted adjacent one end of said flange to allow said carriage to be moved to said toasting position, loading position and raised position.

16. The invention of claim 15 wherein said carriage is mounted for vertical movement relative to said frame, and said toasting position comprises the lowermost vertical position of said carriage and said raised position comprises the uppermost vertical position of said carriage.

17. The invention of claim 16 further comprising a solenoid for holding said carriage in said toasting position.

18. The invention of claim 1 further comprising a spring mounted to one of said frame and carriage, said spring for hindering the movement of said flange from said first flange-receiving area to said second flange-receiving area.

19. An electric toaster comprising:
   a housing frame, said frame having an upper portion defining at least one opening for receiving an item to be toasted;
   a carriage for supporting said item to be toasted, said carriage slidably mounted to said frame and movable relative to said frame to at least a toasting position, a loading position and a raised position;
   a flange fixed to one of said carriage and frame; and
   an abutment member mounted to the other of said frame and carriage including a slot for slidable engagement with said flange, said slot defining at least a first flange-receiving area adjacent one end of said slot and a second flange-receiving area adjacent another end of said slot, said flange-receiving areas being separated by an abutment formation that hinders movement of said flange throughout the full length of said slot;

wherein said flange is forcibly slidable within said slot from said first flange-receiving area past said abutment formation to said second flange-receiving area to correspondingly move said carriage from said loading position to said raised position.

20. The invention of claim 19 wherein one of said flange and at least a portion of said abutment member is deformable to allow said flange to move past said abutment formation from said first flange-receiving area to said second flange-receiving area.

21. The invention of claim 19 wherein said flange is fixed to said carriage for movement therewith, and said abutment member is fixed to said frame.

22. The invention of claim 19 wherein said flange is fixed to said frame and said abutment member is fixed to said carriage for movement therewith.

23. An electric toaster comprising:

a housing frame, said frame having an upper portion defining at least one opening for receiving an item to be toasted;

a carriage for supporting said item to be toasted, said carriage mounted to said frame and manually movable relative to said frame between at least a loading position and a raised position;

a flange fixed to one of said carriage and frame for movement therewith; and an abutment member mounted to the other of said frame and carriage including an elongated slot having an open end for receiving said flange, said slot defining an abutment formation;

wherein said flange and said slot cooperate to releasably lock said carriage in said raised position to prevent said carriage from moving toward said loading position.

24. The invention of claim 23 further comprising at least one spring for biasing said carriage for automatic movement from a toasting position to said loading position, wherein said flange and said slot cooperate to hinder automatic movement of said carriage between said loading position and said raised position.

25. The invention of claim 24 wherein said flange is forcibly slidable within said slot from said first flange-receiving area past said abutment formation to said second flange-receiving area to correspondingly move said carriage from said loading position to said raised position.

26. The invention of claim 23 wherein said flange is fixed to said carriage for movement therewith, and said abutment member is fixed to said frame.

27. The invention of claim 23 wherein said flange is fixed to said frame and said abutment member is fixed to said carriage for movement therewith.

28. A method of toasting a food item, said method comprising:

providing an electric toaster including a housing frame, said frame having an upper portion defining at least one opening for receiving an item to be toasted;

a carriage for supporting said item, said carriage movable relative to said frame to at least a toasting position, a loading position and a raised position, said carriage being biased toward said loading position when in said toasting position;

a flange fixed to one of said carriage and frame for movement therewith; and an abutment member mounted to the other of said frame and carriage including a slot for slidable engagement with said flange and defining an abutment formation;

placing a food item to be toasted within said slot and on said carriage when said carriage is in said loading position;

manually lowering said carriage into said toasting position wherein said food item is toasted;

automatically releasing said biased carriage into said loading position wherein said flange engages said abutment member and movement of said flange is upwardly hindered by said abutment formation;

manually raising said carriage from said loading position to said raised position by moving said flange around said abutment formation; and removing said item to be toasted from said bread carriage.

29. The method of claim 28 wherein the step of manually raising said carriage from said loading position to said raised position is performed by manually lifting a handle mounted to said flange.

30. The method of claim 29 wherein the carriage remains in said raised position until manually lowered back to the loading position.

31. The invention of claim 28 wherein said flange is fixed to said carriage and said abutment member is fixed to said frame.

32. The invention of claim 28 wherein said flange is fixed to said frame and said abutment member is fixed to said carriage.

33. An electric toaster comprising:

a housing frame, said frame having an upper portion defining at least one opening for receiving an item to be toasted;

a carriage for supporting said item to be toasted, said carriage slidably mounted to said frame and manually movable relative to said frame between at least a toasting position, a loading position and a raised position, said loading position of said carriage being vertically higher than said toasting position and said raised position being vertically higher than said loading position; and means for releasably locking said carriage in said raised position and preventing said carriage from moving toward said loading position.

34. The invention of claim 33 wherein said means further comprises a flange fixed to one of said carriage and frame; and an abutment member fixed to the other of said carriage and frame, said member including a slot defining at least one flange-receiving area adjacent one end of said slot for capturing engagement with said flange;

wherein said carriage is positioned in said loading position when said flange is positioned outside said flange-receiving area and said carriage is positioned in said raised position when said flange is positioned within said flange-receiving area.

35. The invention of claim 34 wherein said flange is fixed to said carriage for movement therewith, and said abutment member is in contact with said frame.

36. The invention of claim 34 wherein said flange is fixed to said frame and said abutment member is fixed to said carriage for movement therewith.

* * * * *